Nov. 4, 1952 C. SHEER ET AL 2,616,843
ARC PROCESS FOR THE REDUCTION OF METALS
Filed July 31, 1947 3 Sheets-Sheet 1
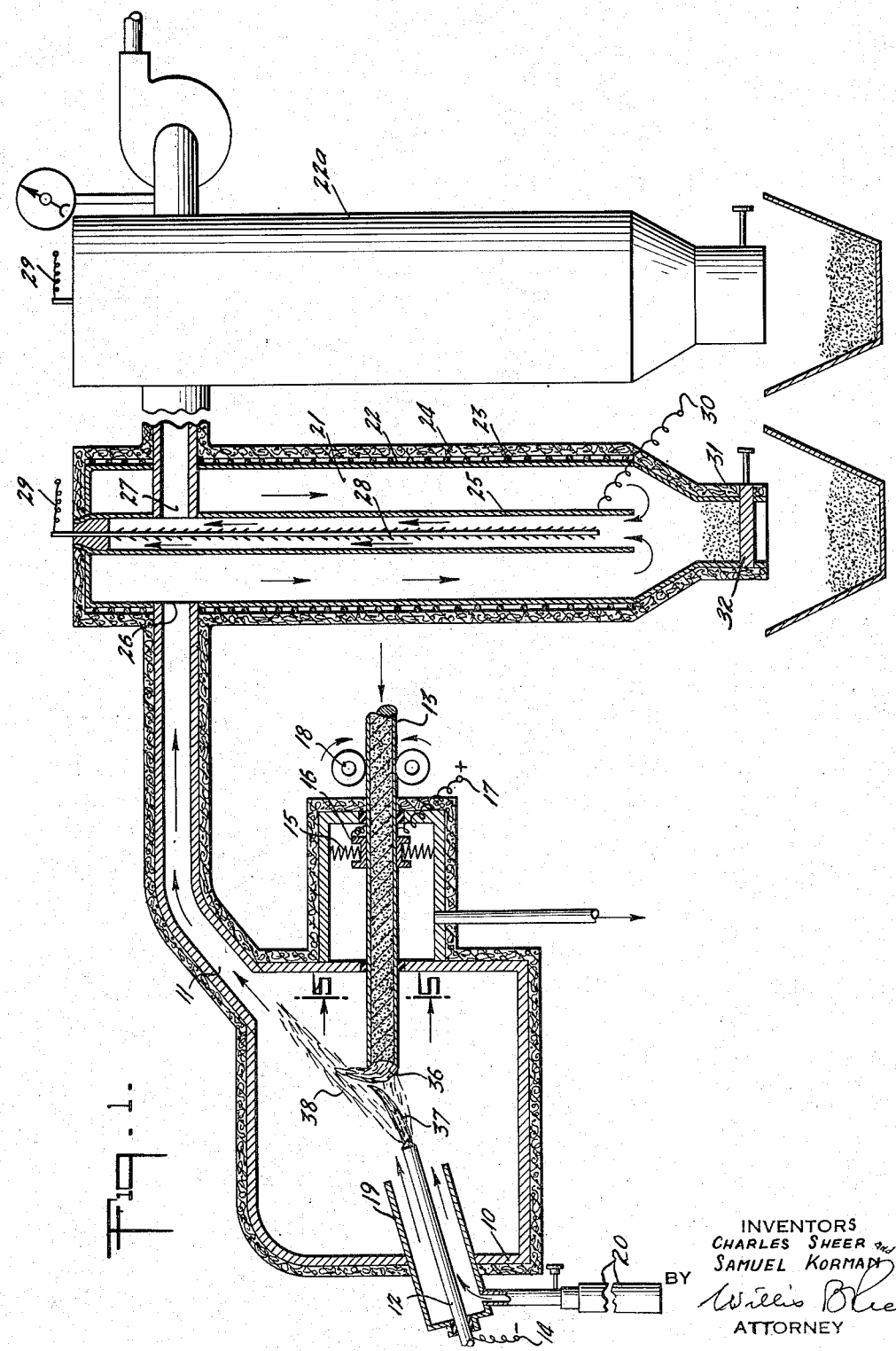
INVENTORS
CHARLES SHEER and
SAMUEL KORMAN
BY
Willis B Rice
ATTORNEY Nov. 4, 1952  C. SHEER ET AL  2,616,843
ARC PROCESS FOR THE REDUCTION OF METALS
Filed July 31, 1947  3 Sheets-Sheet 2
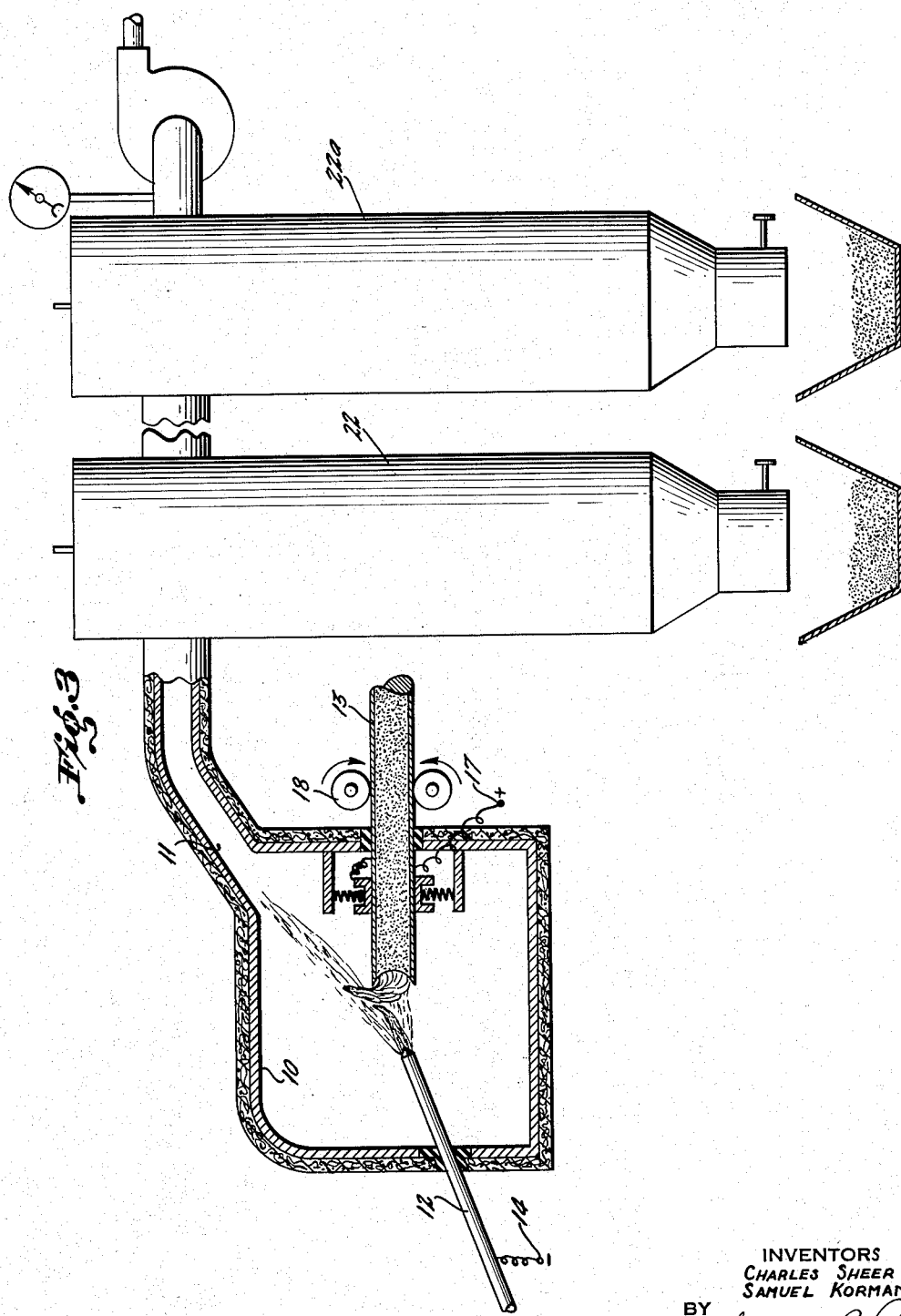
INVENTORS
CHARLES SHEER &
SAMUEL KORMAN
BY
ATTORNEY Nov. 4, 1952   C. SHEER ET AL   2,616,843
ARC PROCESS FOR THE REDUCTION OF METALS
Filed July 31, 1947   3 Sheets-Sheet 3
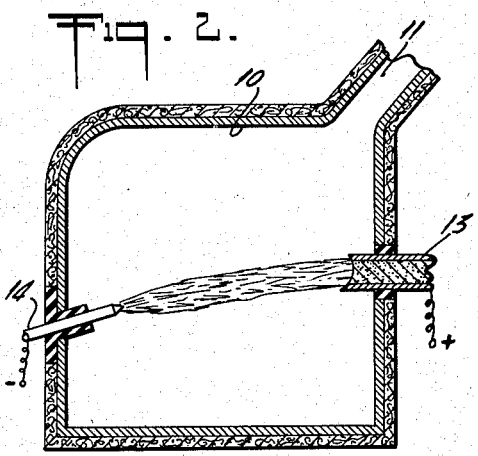
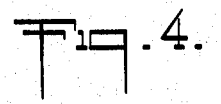
INVENTORS
*CHARLES SHEER*
*SAMUEL KORMAN*
BY
ATTORNEY Patented Nov. 4, 1952

2,616,843

UNITED STATES PATENT OFFICE 2,616,843

ARC PROCESS FOR THE REDUCTION OF METALS

Charles Sheer, Washington Heights, and Samuel Korman, Brooklyn, N. Y.

Application July 31, 1947, Serial No. 765,148

6 Claims. (Cl. 204—164)

This invention refers to a process for reducing metals and metalloids from refractory ores. The process is applicable to the class of ores commonly known as refractory ores, which are difficult to reduce by conventional smelting practices, or by heat and chemical reagents alone, such for example as the compounds of aluminum, magnesium, beryllium, manganese, tungsten, molybdenum, titanium, vanadium, zirconium, tantalum or silicon. The class of refractory substances consists of ores having unusually high melting and boiling points.

It is an object of this invention to provide a process for the reduction of metals by electronic energy, which will be cheaper, simpler and faster than prior processes. It is a further object to provide a process in which the elements comprising the ore may be separated from each other readily and in substantially pure form, or in substantially pure compounds which can be readily separated from each other and which will, if desired, readily yield the metal.

It is a further object to produce a process which will reduce other compounds to commercially useful forms, such as the reduction of compounds of silicon including silica and silicates to more valuable form such as silicon tetra-chloride. This phase of the process assumes particular importance in the treatment of ores such as silicon containing metal ores from which this process will produce not only the metal, but also the other elements of the ore in useful form. For example, in the treatment of clays containing aluminum, silicon, and magnesium the process can produce separately aluminum chloride, magnesium chloride, and silicon tetra-chloride.

It is a further object to produce a process by which elements may be reduced from their ores with a degree of purity which is not practically possible with existing processes.

There exists a large group of ores which are either impossible or very difficult to smelt with carbon by ordinary furnace practice. In such cases the standard metallurgical practice is to convert the ore, usually the oxide or the silicate, into the chloride by heating a mixture of the ore and carbon in an atmosphere of chlorine at elevated temperature. This is well known as the Oersted reaction.

Reactions of this type are carried out essentially with the ores in the solid state, that is the reactions are heterogeneous. The reactions are so slow as to be in many cases without practical value.

In order to achieve a homogeneous reaction, that is with the ores in vapor phase, it has been proposed to heat them in a common electric arc, but these efforts, for many ores have proved of no value. In a conventional smothered arc furnace the conditions are not such as to make a homogeneous reaction possible.

Attempts to expose the material to the highest temperature of the common arc by feeding the material into the arc discharge itself have not resulted in getting a rapid vaporization and through-put of material. In fact all proposals to utilize the common arc that is the low intersity arc are characterized by an extremely slow through-put of material per kilowatt of energy.

In accordance with this invention a different medium is employed to energize the reaction comprising the type of discharge which has come to be known as a "high intensity" arc, or as here used more properly called a "high erosion" arc, by which a rate of vaporization and material through-put is achieved that is enormously greater and of a different order of magnitude than could be otherwise obtained, making the reduction of refractory ores highly economic, so that even low grade ores of certain metals, such as clays, which were economically barred by other processes become available.

The high erosion arc here referred to and employed in this process is of the same general nature as the "high intensity" arc as the term is used in the literature following the nomenclature introduced by Bassett and Sperry. The arc was developed by them for use in search lights, and they gave it its name because of the high intensity of illumination that results as soon as the transition point is passed. In the lighting industry, however, the erosion of the electrodes was a dead loss, and the intensity of light only was desired. The erosion was therefore kept to the minimum. The high erosion arc of this process is an arc of similar character, but in which the light is a loss and the erosion is brought to the maximum.

The high intensity arc (including the high erosion arc) is an entirely different electrical phenomenon from the common arc. It comes into being as a sudden transition from the common arc when current densities at the anode face are employed which exceed a critical value. This change in kind of phenomenon is analogous to the change which occurs at much lower current densities in the transition from a glow discharge to a common arc, which latter transition also occurs suddenly when the current density exceeds a critical point.

The location of the critical point in both cases depends upon a variety of factors but in any given case the critical point is sharply shown and easily recognized by the marked changes in appearance and basic properties of the discharge. These changes all occur at the transition point and are the direct result of the difference of functioning of the two arcs.

The term high intensity or high erosion is not too felicitous and must not cause confusion between this new type of arc and a common arc using a high current, since it is possible to operate a common arc with thousands of amperes without getting the high erosion effect and on the other hand the high erosion effect may be obtained with currents as low as 10 amperes with very small electrodes.

The markedly new characteristics which come into being with high erosion arc is when the current density exceeds the critical point, include the following:

In the normal arc the crater of the anode, which is the hottest portion of the arc, reaches a temperature not greater than 3600 degrees C. This temperature is not sufficient to cause more than a negligible vaporization of the anode. The energy is dissipated predominantly in the form of radiation, and the erosion of the anode that occurs in air is almost wholly a slow oxidation of the solid incandescent carbon. In the new arc the temperature jumps to between 7000 and 10,000 degrees C. At that temperature the entire electrode, including the carbon, is vaporized at great speed, resulting in a superheated region of extremely brilliant gases immediately before the anode face which obscure the anode and in turn become an exceedingly brilliant source of light. It is the high light intensity of these vapors which first gave the new arc its name.

The result of this vaporization is also the emission from the anode of a high velocity jet of brilliantly luminous highly ionized vapor which shoots off out of the path of the current stream at a velocity of the order of one-sixth the velocity of sound. This brilliant jet may extend out as much as two feet from the electrode, although the electrode spacing may not be more than an inch.

Another of the characteristics which come into being at the critical point is a very sharp rise in the rate of erosion of the electrodes. With the common arc the energy is largely converted into radiant energy, and an increase in energy input within that range does not make a corresponding increase in the rate of erosion. As soon as the critical point of current density is reached, however, the very sharp bend occurs upward in the curve between power input and erosion rate, and the erosion becomes substantially proportional to the power input.

There also occurs with these phenomena a marked change in the volt-ampere curve of the apparatus discharge. In the normal arc range an increase in current is accompanied by a decrease in voltage across the arc. Such an arc, therefore, requires a ballast for operation. This is spoken of as a negative resistance characteristic.

Within the range of the high erosion arc, however, the arc acts like any normal resistance, requiring additional voltage to send more current. This is commonly referred to as a positive resistance characteristic. This sudden change from negative to positive resistance characteristic is therefore another feature by which the high erosion arc can be distinguished from the common arc.

This application is a substitute for our prior applications: Ser. No. 399,846, filed June 26, 1941, Ser. No. 467,800, filed December 3, 1942, and Ser. No. 611,088, filed August 17, 1945. These applications have been abandoned and this application filed in substitution because our further investigations have shown that the methods of carrying out the invention described in those applications are not the best or most efficient manner of achieving results, and we have come to understand more fully the principles of the process upon which the quantitative application of the process to any particular ore depends.

The low current arc as used in the reduction of metals to which we have previously referred, is essentially a discharge in atmosphere directly between electrodes. The electrodes themselves did not melt even at the highest temperatures and the vaporization was negligible and played no particular part in the arc phenomena. Such erosion of the anode as took place was almost purely combustion and even that did not occur in a neutral atmosphere. The only value of such an arc in process is as a source of heat and that was quite inadequate to reduce the refractory ores and carbon to vapor form. As a source of heat it was not considered to make difference how the ore was introduced into the arc, and various means were suggested. Thus attempts were made to blow powdered ore into the arc flame, or to force a pencil of ore into the flame, or to incorporate ore into the electrodes, or to submerge the arc beneath the powdered material. In the prior art these means have been regarded as equivalents, and in practice they have been equally unsuccessful.

We have formed an ore, mixed with enough carbon to render it conductive, into a hard electrode and used that electrode as the anode of an electric arc, choosing that method because of the fact that the highest temperature occurring in the arc is known to be at the anode crater. The results, however, from every practical point of view were negligible.

We first notice the new effect to which we have previously referred by noticing that when the length of the arc was stretched out to a pronounced degree beyond normal and beyond a certain critical point, that the phenomena of the arc were remarkably changed, and simultaneous with this change was a marked magnification of the reaction rate.

A typical experiment of this character is as follows:

An arc discharge was struck in an atmosphere of chlorine using a graphite cathode and an anode of briquet material containing kaolin as the ore to be reduced and having a diameter of ⅜". The length of the arc was slowly increased in order to observe the effect of the transition from a low voltage to a high voltage. At first when the arc was of the order of ½ inch long, no noticeable reaction took place even after many minutes had elapsed. The voltage was of the order of 40 volts and the current about 20 amperes, and the arc was brilliant white and uniform in color characteristic of a carbon arc. As the length increased the voltage rose continuously while the current dropped, without a noticeable change in reaction rate.

However, when the arc length had increased to about one inch the voltage reaching the order of 100 volts and the current dropping to 8 amperes, a sudden change in the nature of the phenomenon occurred. Dense white clouds spewed forth from the anode crater and the color of the arc changed from white to reddish orange characteristic of the emission spectrum of aluminum in the vapor form. The briquet anode began to be consumed very rapidly so that the reaction was completed in a matter of seconds. Subsequent examination showed the while clouds to consist of aluminum chloride while an oily liquid condensate proved to be $SiCl_4$. Further tests showed conclusively that this phenomenon was impossible unless (1) a critical point was reached in the length of the arc characterized by a much higher voltage than is characteristic of arc furnace reactions; (2) the ore was introduced as the anode of the arc. A further lengthening of the arc to three or four inches steadily increased the reaction rate.

This increased erosion effect was obtained in spite of the fact that the arc current was reduced. We then increased the current to its former value with the arc still elongated and found the new effect still further enhanced.

Then we found that if we increased the current beyond a certain critical value, the effect could be obtained without great prolongation of the arc length.

This new arc, which we term a high erosion arc had many features in common with the type of arc which was developed for high intensity search-lights, and which, because of the high intensity of illumination which it maintains at a point adjacent to the anode, is called a high intensity arc. It is also called a high current arc to distinguish it from the common arc, which generally operates with much less current.

We have introduced the term high erosion arc to distinguish our new arc, since in the operation of this process the object to be attained is the high erosion or conversion of the anode material, and the high light intensity is not desired. This is in contrast with the high intensity arc where the high anode erosion is a very distinct detriment and the high intensity of illumination is the essential object.

The high erosion arc and the high intensity arc involve the same anodic mechanism that comes into being in the elongated arc, but they maintain it at a much higher rate.

When the current of an arc which is not quenched is increased far beyond common limits the arc changes character entirely, as soon as a critical value of current is reached. As this critical value is exceeded there commences to appear adjacent to the anode crater a considerably extended region of intense ionization containing the ionized material of the anode, while at the same time a thin tongue of flame shoots out from the cathode which at the beginning is a small tongue in the middle of the arc flame.

The region of intense ionization at the anode of the high current arc is of the same character as the region of intense ionization of the long drawn out arc to which we have referred, except that in the latter the depth of the region is much smaller and may at times not be easily distinguishable from the crater surface, whereas in the high intensity arc this region may in some circumstances shoot out from the anode for a great distance.

When the region of intense ionization first appears (using anodes having a diameter of 16 mm. and the cathode 11 mm.) at a current of about 80 amperes, a thin fine flame shoots out of the cathode in the middle of the arc flame. As the current is increased, however, this negative flame takes the form of a high speed jet which can strike the anode with a scouring effect. This jet comprises electrons, which if the process be conducted in an atmosphere of chlorine, carry with it chlorine ions which are also negative in polarity.

This region of intense ionization adjacent to the anode appears to contain, beside the ore ions to which we have referred, vapor of the ore or of some of its elements, and in addition minute particles of the ore thrown off from the anode crater. The ions may be formed in part by collision of the high speed electrons with the surface of the anode, but they are probably largely produced by collision of the electrons with the ore vapor and the minute ore particles. It is in this region that the phenomena of this process are believed to predominate.

The amount of current required to produce the phenomena we have described is dependent upon the size of the electrodes used. The current does not, however, increase in proportion to the increase in cross sectional area of the anode, since small electrodes require a much higher current density than large ones, as shown in the following table:

| Diameter of anode | Current required | Current per mm.² |
|---|---|---|
| 8.5 mm | 80 | 1.41 |
| 11 mm | 90 | .94 |
| 16 mm | 100 | .49 |

It is difficult to define accurately the minimum of voltage or current where the high erosion effect begins, since these depend upon many factors, some of which are difficult for the user of the process accurately to evaluate. Fortunately this is not necessary, since the essential phenomena are readily recognizable. As soon as we raise the current density above the critical value, the resistance characteristic of the arc discharge, between the electrode faces, changes from negative to positive, the erosion rate is suddenly enormously increased, and the anode jet flame begins. The latter assumes a dominant role in the arc mechanism, and it becomes very noticeable as the current is increased.

The most noticeable of these is the appearance of the positive and negative flames projecting from the electrodes. In the working of this process, however, these minima are of small significance, in that to secure best results in practice it will always be far exceeded. For any size carbon the current should be as large as the technique of the operator can handle, the only practical limit being when the anodes erode away faster than they can be replenished, or faster than the products of the reaction can be handled.

In accordance with our present experience, we recommend that with 16 mm. anodes the current be about 500 amperes, varying up to 1600 amperes where 50 mm. anodes are used. In either case the figures suggested will be increased by the operator as fast as the technique of controlling the factors develops.

In both these forms of arc it will be seen that conditions are attained where the electrons move through a long field with a high potential gradient, causing them to attain the more-than-critical velocity, as evidenced by the presence of this extended region of maximum ionization.

The invention accordingly comprises a process composing the advantages and accomplishing results and involving the relationship of the steps one to another which will be exemplified in a process herein described and the scope of the application of the invention will be indicated in the claims.

For a fuller understanding of the nature and objects of the invention, reference should be had to the following detailed description taken in connection with the accompanying drawings, in which we show several forms of apparatus by which the process may be carried out. In these, Fig. 1 shows an elevation partly in cross section of an apparatus embodying this invention for the reduction of ores with high current arc in a reducing gas. Fig. 2 is a section corresponding to a portion of the structure of Fig. 1, showing a modification of the device when a long arc is employed. Fig. 3 is an elevation partly in section of apparatus in which the process may be conducted at low pressures. Fig. 4 is a section of the anode on the line 5—5 of Fig. 1.

We will first proceed to describe the conduct of the process with our preferred apparatus. Referring now to Fig. 1, the numeral 10 designates a chamber which is closed except for an outlet 11 through which the products of the reaction may be carried off. Extending from the opposite walls of the chamber are two electrodes 12 and 13, both of which make a tight fit with the walls of the chamber to prevent the escape of chlorine, at the same time permitting the feeding of the electrodes inwardly into the chamber.

The electrode 12 constitutes a cathode and to this end is connected with the negative side of the source of current at 14. As the cathode is not wasted away with great rapidity special feeding means for the cathode need not be provided. The anode 13 on the other hand which contains the ore to be reduced has special feeding means. As here shown, brackets 15 carry contact brushes 16 which are spring pressed against the surface of the anode 13. These brushes are connected to the positive side of the current as at 17 and serve to energize the anode itself. Rollers 18 bear against the surface of the electrode to feed it forward at the same rate that it is consumed.

The cathode 12 may be of solid carbon, but advantages have been found in using a neutral soft cored carbon, as such a carbon increases the jet effect of the negative flame. The electrode 13, see Fig. 4, is preferably made of an outer conducting shell of graphite or carbon, containing as a core a compressed mixture of the ore to be reduced together with carbon. Several advantages flow from such a construction. First the outer shell of the carbon furnishes a better conductor of electricity to the arc than if all the electrodes were made of core material. Moreover, the use of a cored carbon of this kind helps to centralize the crater of the arc upon the anode tip. Discretion is permissible in the amount of carbon to be used in the core, but we have obtained satisfactory results with a composition containing about 85% ore and 15% carbon.

Since the function of the carbon in the anode is to render it conductive, if much less than 15% is used, the resistance of the anode will be unduly high. On the other hand, too much carbon merely wastes power, without corresponding benefit.

As will be seen from the figure, we prefer to have the cathode not quite in alignment with the anode, so that the effect of the negative flame is to project the products of reduction upwardly into outlet 11.

Means may, if desired, be provided to rotate the anode as it is fed into the arc chamber to equalize the consumption and maintain the crater form.

The chamber 10 is shown in the drawings diagrammatically as a single walled vessel. It is desirable to keep the temperature within this chamber and within the subsequent conduits high enough to avoid undesirable precipitation of reaction products within the chamber. To this end the chamber 10 may be protected by an insulator, or its temperature may be thermostatically controlled and the chamber may be artificially heated to insure that all the products of the reaction shall pass upwardly through the outlet 11.

This process is here conducted in chlorine. To this end the cathode 12 is surrounded with an annular sleeve 19, defining a channel through which chlorine may be introduced from a source 20.

With this apparatus the products of the reduction will leave the reaction chamber as chlorides, either in finely divided fume or in vapor form. It is preferable that at least all but one of them be in vapor form to facilitate separation. There is a tendency of finely divided solids to settle on the walls of the apparatus so that better results of recovery can be attained when all pass out of the reaction chamber in vapor form.

Any practical means for condensing or precipitating these products of the reduction to permit the segregation may be employed. As here shown, there is introduced into the circuit one or more Cottrell precipitators 21, each having an outer shell 22 which may have its temperature controlled by the heater 23 and which may be protected from loss of heat by insulation 24. Axially disposed within this shell is a central cylinder 25 opening at the bottom. The outer shell 22 communicates at 26 with the discharge opening of the chamber 10, while the inner cylinder 25 discharges through an opening 27. Centrally disposed with the inner cylinder is an electrode 28 of the customary form which is electrically positively charged with high tension at 29 as is customary with such precipitators: the negative side of the circuit is connected with the cylinder 25. A discharge spout 31 is provided at the bottom of the vessel 22 under control of a valve 32. With this embodiment the elements of the ore will be in the form of chlorides.

The arc shown in Fig. 1 is typically the high current arc, and a typical case for the reduction of kaolin with small carbons of for example 11 mm. cathode and a cored 16 mm. anode would use a voltage of about 90 volts with a current of about 500 amperes.

In Fig. 1 the region of intense ionization is indicated by the numeral 36, the negative flame is indicated by the numeral 37 and, as will be seen, the negative flame crowds the region of intense ionization into the immediate vicinity of the anode. The numeral 38 is the customary arc sheath or corona, which as will be seen is distinct from the negative flame.

In the conduct of this process it is neither necessary or desirable that sufficient energy through electronic impact alone be supplied to effect the complete decomposition of the molecules. This result can be accomplished much more economically, once the molecules are unstabilized, by the concomitant use of heat energy.

Certain practical features in the operation of the high and superhigh intensity arc are desired. These are current feed accomplished by the use of thin graphite shell, connected or separated from the core; the briquet, or core, composition, inasmuch as in order to achieve the conditions of ionization stated above, the ore must be presented as the positive electrode of the arc, it is necessary that carbon be included into the briquet or core. There will then be an optimum composition which will be determined by the relative proportion of ore and carbon, and their heats of vaporization and the optimum composition will be in the ratio of the proportion of carbon multiplied by its heat of vaporization to that proportion of ore × its heat of vaporization. The optimum proportion is a balance between the amount of carbon required to render the briquet sufficiently conductive and the minimum energy which would have to be utilized for vaporization of that amount of carbon.

Fig. 2 shows the same apparatus operated with an elongated arc instead of a high current arc. Here the arc has been stretched to a length of three or four inches or more. The region of intense ionization here is of much smaller depth and it may be masked by the color thrown into the flame by the reduction of the ore. In this arc, the corona may even resemble the usual arc in appearance except for its length and coloring, but it differs fundamentally from the usual arc in the presence of the region of intense ionization which the ordinary arc does not possess, and, therefore, it can be used in this process as disclosed in my former applications.

A typical laboratory example of the carrying out of the process for the reduction of aluminum from clay at reduced pressure is as follows:

Length of arc, 4 inches
Diameter of anode, ⅜ inch
Voltage across electrodes, 180 volts
Current through arc, 8 amperes
Gas pressure, 7 cms.

With these conditions, a series of tests showed an ore reduction of 42%, at a power consumption of 50 kwh. per pound of metal produced.

Different metals and different compounds of the same metal have different critical minimum ionization voltage, and the gas pressure maintained will affect the mean free path and hence affect the interelectrode voltages.

The increase in voltage above the critical minimum moreover is distinctly advantageous, since with higher voltages a greater percent of the electrons will attain the minimum. Moreover, there is reason to believe that at higher voltages multiple ionizations occur.

Because of these complications and because of the simplicity of the tests and because of the ease with which the minimum can be attained by test, it would not be helpful to try to produce a table or formula for any set conditions. The only practical way is to raise the arc length until results appear.

In the construction shown in Fig. 3 the apparatus is essentially similar to that described in Fig. 1 and the same numerals are applied to the elements, except that in this case the process is conducted at low pressure instead of in an atmosphere of chlorine. The construction shown in Fig. 3 differs, however, from that of Fig. 1 in that no means are provided for introducing chlorine into the reaction chamber, and the exhausting apparatus will not include any means for handling chlorine, but it will be designed to maintain a low pressure up to 10 mm. Hg.

The vacuum process is most suited to the reduction of compounds such as the carbides of the metals, where all the reaction products are solids, and consequently reduce the problems of maintenance of the low gas pressure to a minimum.

eW claim:

1. The process of recovering metals from their refractory ores which comprises forming an electrode of said ore with substantially 15% of carbon, maintaining, with said electrode as anode, an arc in a halogen containing atmosphere, the arc being maintained at a current density on the anode face higher than that required to cause the appearance of a tail flame of anode vapor and to give to the arc a positive resistance characteristic, and then carrying off the vapors and separating them.

2. The process in accordance with claim 1, in which the constitutent vapors are separated by electrostatic precipitation.

3. The process in accordance with the claim 1, in which the constitutent vapors are separated and collected by fractional condensation and by electrostatic precipitation.

4. The process in accordance with claim 1, in which the halogen is chlorine.

5. The process in accordance with claim 1, in which the halogen is chlorine and the vapors are separated by electrostatic precipitation.

6. The process in accordance with claim 1, in which the halogen is chlorine and in which the vapors are separated and collected by fractional condensation and by electrostatic precipitation.

CHARLES SHEER.
SAMUEL KORMAN.

REFERENCES CITED

The following references are of record in the file of this patent:

UNITED STATES PATENTS

| Number | Name | Date |
|---|---|---|
| 916,793 | Seward et al | Mar. 30, 1909 |
| 964,566 | Schwahn | July 19, 1910 |
| 1,402,128 | Wolcott | Jan. 5, 1922 |
| 1,418,528 | Burgess | June 6, 1922 |
| 1,650,894 | Koehler | Nov. 29, 1927 |
| 1,752,936 | Austin et al. | Apr. 1, 1930 |
| 2,184,885 | Muskat et al. | Dec. 26, 1939 |
| 2,306,184 | Pechukas | Dec. 22, 1942 |
| 2,040,215 | Rava | May 12, 1936 |

FOREIGN PATENTS

| Number | Country | Date |
|---|---|---|
| 455,185 | Great Britain | Oct. 15, 1936 |

OTHER REFERENCES

Thomson, Conduction of Electricity Through Gases, vol. II (1933), pp. 589, 590.

Fan, Physical Review, vol. 55 (1939), pp. 769–775.